April 21, 1959     H. H. HUSTED     2,882,891
MEASURING DEVICE FOR DETERMINING INTRAOCULAR PRESSURE
Filed June 24, 1957
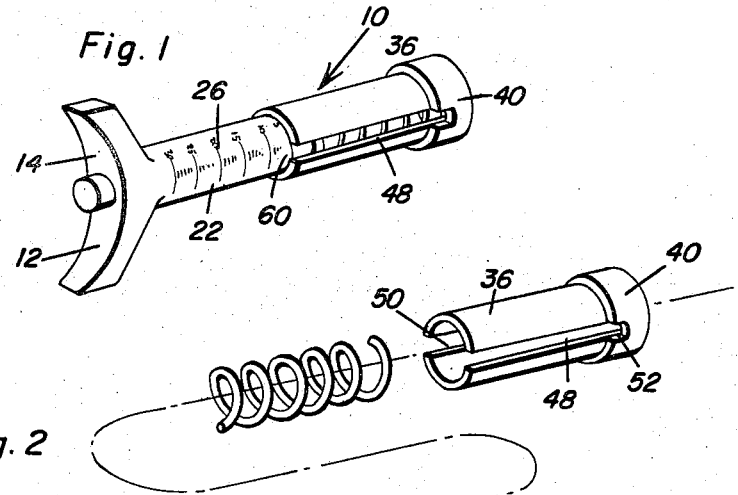
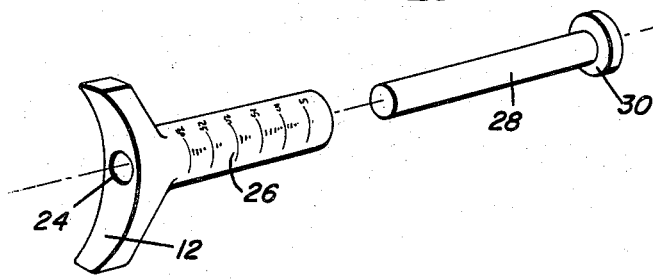
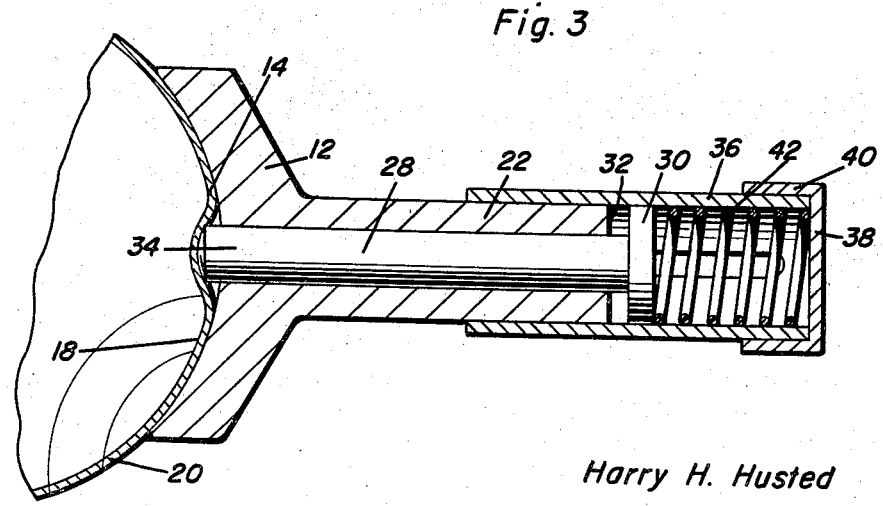
Harry H. Husted
INVENTOR.

United States Patent Office 2,882,891
Patented Apr. 21, 1959

2,882,891

MEASURING DEVICE FOR DETERMINING INTRAOCULAR PRESSURE

Harry H. Husted, Evansville, Ind.

Application June 24, 1957, Serial No. 667,460

3 Claims. (Cl. 128—2)

This invention relates to a measuring device for determining intraocular pressure and more particularly to a tonometer which may be placed directly on the eyelid of an eye which is closed to obtained the intraocular pressure without the necessity of applying a local anesthetic.

The primary object of the present invention resides in the provision of means for determining the intraocular pressure of an eye by applying the tonometer directly onto the eye with the eyelid closed an which, without the use of complicated weights or the like may provide a direct reading of the relative intraocular pressure of the eye as compared to normal.

In the detection, diagonsis and treatment of diseases of the eye and especially of glaucoma, it is necessary to determine whether there is too much pressure which may eventually destroy sight. By utilizing the present invention an accurate and convenient means for checking intraocular pressure can be had without requiring a local anesthetic or the like to be applied on the eye as in otherwise necessary when the intraocular pressure has to be attained with the open eye.

Still further objects and features of this invention reside in the provision of a measuring device for determining intraocular pressure which may be manufactured of various readily available materials such as wood, light metals, plastic or the like, which is capable of being constructed at a relatively low cost, which is of comparatively high accuracy, and which is especially convenient to use.

These, together with the various ancillary objects and features of the invention which will become apparent as the following description proceeds, are attained by this measuring device for determining intraocular pressure, a preferred embodiment of which has been illustrated in the accompanying drawings, by way of example only, wherein:

Figure 1 is a perspective view of the device comprising the present invention;

Figure 2 is an exploded perspective view illustrating the various components and elements of the invention; and Figure 3 is an enlarged sectional detail view illustrating the device as utilized in determining intraocular pressure.

With continuing reference to the accompanying drawings wherein like reference numerals designate similar parts throughout the various views, reference numeral 10 generally designates the device comprising the present invention. This measuring device includes a base 12 of an arcuate shape having a curvature as at 14 substantially conforming to the contours of an eye with the eyelid closed, the eye being indicated at 18 and the eyelid at 20. The base 12 has a barrel 22 integrally formed therewith, the barrel being hollow and in alignment with the bore 24 through the base 12. Inscribed on the barrel 22 is indicia 26 forming a scale.

Slidable within the hollow barrel and the bore 24 and of greater length than the combined length of the base 12 and the barrel 22 and along the longitudinal axis thereof is a plunger 28 having an enlarged limit head 30. The plunger is of such length that when the head 30 engages the end 32 of the barrel 22 remote from the base 12, approximately 4 millimeters of the end 34 of the plunger 28 will extend beyond the base 12.

Slidably mounted on the barrel 22 is a cap 36 of a tubular construction having a closed end wall 38 formed by the end portion 40 of the cap which is mounted or otherwise affixed to the tubular portion 36 of the cap or integrally formed therewith. Disposed within the cap 36 and biasing the end wall 38 and the limit head 30 is a spring 42 which when placed under compression will force the plunger 28 to form an indentation in the eye of a patient. The tubular portion 36 of the cap is slotted as at 48 and 50 and a portion of the end section 40 of the cap may be slotted also as at 52. By utilizing the slots 48 and 50, the position of the head 30 can be readily observed.

In operation, the base 12 is placed on the upper lid, the eye being closed and directed downward. With the plunger in position, the bottom of the plunger will rest on the surface of the lid. Now with the cap holding the spring in position on the head of the plunger, pressure is applied to the top of the cap.

The spring 42 within the cap will register the pressure applied, the distance through which the cap moves over the barrel can be read on the scale 26 and is directly proportional to the pressure applied on the cap. When pressure is applied to the cap and transmitted to the plunger, the plunger 34 will indent the eye, the amount of indentation being limited to 4 millimeters. The scale on the side of the barrel will indicate the distance through which the cap 36 moves so as to cause the spring 42 to press the head 30 of the plunger 28 into engagement with the end 32 of the barrel 22. This distance will then show the amount of pressure required to produce an indentation of 4 millimeters in the eye.

The spring 42 may be designed to hold a load of two pounds at full compression. The average pressure on the normal eye will run to about 5 millimeters as indicated in Figure 1 at 60 on the scale 26, it being noted that the scale 26 will cover a movement of the cap 36 of 30 millimeters, thus giving the instrument the capacity to measure a pressure 6 times normal.

Utilizing this instrument the pressure is measured through the upper eyelid thus avoiding the cornea and other highly sensitive tissues of the eye which may be damaged by direct contact of rough instruments. Further, medication and anesthesia are eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for measuring intraocular pressure comprising an arcuate base having a curvature substantially conforming to the contour of a closed eye, said base having a bore therethrough, said base having a hollow barrel integrally formed therewith, said barrel being in alignment with said bore, a plunger of greater length than said barrel and said base extending through said barrel and said bore, said plunger having a limit head on the end thereof remote from said base engageable with said barrel, a tubular cap slidably positioned on said barrel and having a closed end wall, and a spring in said cap engaging said end wall and said head, said cap having elongated slots therethrough extending substantially the length of said cap through which said head and a portion of said barrel can be observed.

2. A device for measuring intraocular pressure comprising an arcuate base having a curvature substantially conforming to the contour of a closed eye, said base having a bore therethrough, said base having a hollow barrel integrally formed therewith, said barrel being in alignment with said bore, a plunger of greater length than said barrel and said base extending through said barrel and said bore, said plunger having a limit head on the end thereof remote from said base engageable with said barrel, a tubular cap slidably positioned on said barrel and having a closed end wall, and a spring in said cap engaging said end wall and said head, said barrel having a scale thereon, the end of said cap cooperating with said scale to give a reading of intraocular pressure.

3. A device for measuring intraocular pressure comprising an arcuate base having a curvature substantially conforming to the contour of a closed eye, said base having a bore therethrough, said base having a hollow barrel integrally formed therewith, said barrel being in alignment with said bore, a plunger of greater length than said barrel and said base extending through said barrel and said bore, said plunger having a limit head on the end thereof remote from said base engageable with said barrel, a tubular cap slidably positioned on said barrel and having a closed end wall, and a spring in said cap engaging said end wall and said head, said cap having elongated slots therethrough extending substantially the length of said cap through which said head and a portion of said barrel can be observed, said barrel having a scale thereon, the end of said cap cooperating with said scale to give a reading of intraocular pressure.

References Cited in the file of this patent

UNITED STATES PATENTS

| | | |
|---|---|---|
| 1,743,461 | La Force | Jan. 14, 1930 |
| 2,622,439 | Copper | Dec. 23, 1952 |
| 2,656,715 | Tolman | Oct. 27, 1953 |

FOREIGN PATENTS

| | | |
|---|---|---|
| 559,952 | Germany | Sept. 26, 1932 |